United States Patent
Ernström et al.

(10) Patent No.: US 9,306,800 B2
(45) Date of Patent: Apr. 5, 2016

(54) INTER-DOMAIN FAST REROUTE METHODS AND NETWORK DEVICES

(71) Applicant: TELEFONAKTIEBOLAGET L M ERICSSON (PUBL), Stockholm (SE)

(72) Inventors: Lars Ernström, Palo Alto, CA (US); Pramodh D'Souza, San Jose, CA (US); Zoltán Tóth, Santa Clara, CA (US)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 222 days.

(21) Appl. No.: 13/891,969

(22) Filed: May 10, 2013

(65) Prior Publication Data

US 2014/0334286 A1    Nov. 13, 2014

(51) Int. Cl.

| G01R 31/08 | (2006.01) |
|---|---|
| H04L 12/24 | (2006.01) |
| H04L 12/715 | (2013.01) |
| H04L 12/703 | (2013.01) |
| H04L 12/723 | (2013.01) |

(52) U.S. Cl.
CPC ............ *H04L 41/0668* (2013.01); *H04L 45/04* (2013.01); *H04L 45/28* (2013.01); *H04L 45/50* (2013.01)

(58) Field of Classification Search
USPC ............... 370/216–219, 221–329, 390–401; 709/203–229
See application file for complete search history.

(56) References Cited

U.S. PATENT DOCUMENTS

| 8,165,121 B1* | 4/2012 | Singh ............................ 370/389 |
| 8,243,604 B2* | 8/2012 | Kothari et al. .................. 370/238 |
| 8,743,679 B2* | 6/2014 | Gerstel et al. ................. 370/218 |

(Continued)

OTHER PUBLICATIONS

Atlas et al., "An Architecture for IP/LDP Fast-Reroute Using Maximally Redundant Trees Draft-Atlas-RTGWG-MRT-FRR-Architecture-01", Internet-Draft, MRT FRR Architecture, Oct. 2011, 26 pg.

(Continued)

*Primary Examiner* — Man Phan
(74) *Attorney, Agent, or Firm* — Nicholson De Vos Webster & Elliott LLP

(57) ABSTRACT

A network device, is to be deployed in a network between a first network domain and a second network domain, and is to be configured for fast reroute. The network device includes a first traffic forwarder control module, corresponding to the first network domain, which is to determine a primary next hop in the first network domain. The control plane includes a second traffic forwarder control module, corresponding to the second network domain, which is to determine a backup next hop in the second network domain. The backup next hop is to be used as a fast reroute for the primary next hop in response to a failure associated with the primary next hop. The control plane includes a controller module, in communication with the first and second traffic forwarder control modules, which is to configure a forwarding structure of the forwarding plane with the primary and backup next hops.

17 Claims, 7 Drawing Sheets

(56) References Cited

U.S. PATENT DOCUMENTS

| | | | | |
|---|---|---|---|---|
| 8,848,519 B2* | 9/2014 | Kini et al. | | 370/228 |
| 8,861,340 B1* | 10/2014 | Atlas | | 370/225 |
| 2006/0193248 A1 | 8/2006 | Filsfils et al. | | |
| 2006/0209682 A1 | 9/2006 | Filsfils et al. | | |
| 2006/0215548 A1* | 9/2006 | Le Faucheur et al. | | 370/228 |
| 2007/0041326 A1* | 2/2007 | Babiarz et al. | | 370/237 |
| 2013/0089094 A1* | 4/2013 | Csaszar et al. | | 370/390 |
| 2013/0301403 A1* | 11/2013 | Esale et al. | | 370/221 |
| 2014/0219090 A1* | 8/2014 | Ramanathan et al. | | 370/235 |

OTHER PUBLICATIONS

Bryant et al., "Remote LFA FRR Draft-Shand-Remote-LFA-00", Internet-Draft, Remote LFA FRR, Oct. 2011, 12 pg.

Atlas et al., "Basic Specification for IP Fast Reroute: Loop-Free Alternates", RFC 5286, IP Fast Reroute: Loop-Free Alternates, Sep. 2008, 31 pages.

Filsfils et al., "Loop-Free Alternate (LFA) Applicability in Service Provider (SP) Networks", FRC 6571 LFA Applicability in SP Networks, Jun. 2012, p. 35.

* cited by examiner

INTER-DOMAIN FAST REROUTE METHODS AND NETWORK DEVICES

BACKGROUND

1. Field

Embodiments of the invention relate to the field of networking; and more specifically, to fast reroute in networking.

2. Background Information

Network failures occasionally occur in Internet Protocol (IP) networks. By way of example, the network failures may be due to a failure of one or more routers or other network devices, a failure of one or more links, a failure of one or more links within a shared risk link group, or the like, or a combination thereof.

A significant problem with such network failures is the data loss that may occur if actions are not taken to restore the network failure. Routing protocols typically used in such IP networks generally have relatively long convergence times following a network topology change due to such network failures. Representatively, the convergence times of the routing protocols may be on the order of hundreds of milliseconds, or even longer. Such relatively long convergence times may cause significant data loss to occur if other actions are not taken to restore the network failure.

IP fast reroute technologies are commonly employed in IP networks in order to help reduce traffic loss following such network failures. By way of example, IP fast reroute may involve pre-computing or otherwise pre-determining alternate or backup next hops for corresponding primary next hops. The forwarding planes of routers may be pre-provisioned with both the primary next hop used for normal traffic forwarding before the network failure, as well as the backup next hop to be used for traffic forwarding after the network failure. After detecting a failure associated with the primary next hop, the forwarding planes and/or routers may rapidly switch from the primary next hop to the backup next hop, and may begin forwarding network traffic using the backup next hop. The switch from the primary next hop to the backup next hop generally occurs relatively rapidly. Representatively, the switch from the primary to backup next hop may occur within a period of time that is on the order of tens of milliseconds, or even less. Such times are typically significantly less than the times needed for the routing protocols to gather updated network information re-converge. The backup next hop may provide a temporary backup or alternate path on which the network traffic may be forwarded while the routing protocols re-converge. Advantageously, such use of IP fast reroute may help to significantly reduce data loss following network failures.

Various versions of IP fast reroute are known in the arts. RFC 5286, entitled Basic Specification for IP Fast Reroute: Loop-Free Alternates, published September 2008, discloses further details of one known approach to employ IP fast reroute in a domain or routing area.

SUMMARY

In one aspect, a network device is operable to be deployed in a network between a first network domain and a second network domain and is operable to be configured for fast reroute. The network device includes a forwarding plane that includes one or more line cards. The network device includes a control plane that includes one or more cards coupled with the forwarding plane. The control plane includes a first traffic forwarder control module corresponding to the first network domain. The first traffic forwarder module is operable to determine a primary next hop in the first network domain. The control plane also includes a second traffic forwarder control module corresponding to the second network domain. The second traffic forwarder control module is operable to determine a backup next hop in the second network domain. The backup next hop is to be used as a fast reroute for the primary next hop in response to a failure associated with the primary next hop. The control plane also includes a controller module in communication with the first and second traffic forwarder control modules. The controller module is operable to configure a forwarding structure of the forwarding plane with the primary and backup next hops. One possible advantage of the network device is an ability to allow a backup next hop to exist in a different network domain than its corresponding primary next hop.

In another aspect, a method is in a network device that is deployed in a network between a first network domain and a second network domain. The method is one of configuring the network device for fast reroute. The method includes a step of determining a primary next hop, in the first network domain, with a first traffic forwarder control module that corresponds to the first network domain. The first traffic forwarder control module is implemented on a control plane that includes one or more control cards. The method also includes a step of determining a backup next hop, in the second network domain, with a second traffic forwarder control module that corresponds to the second network domain. The second traffic forwarder control module is implemented on the control plane that includes the one or more control cards. The backup next hop is to be used as a fast reroute for the primary next hop in response to a failure associated with the primary next hop. The method also includes a step of configuring a forwarding structure with the primary and backup next hops. The forwarding structure is implemented on a forwarding plane of the network device that includes one or more line cards. One possible advantage of the method is an ability to allow a backup next hop to exist in a different network domain than its corresponding primary next hop.

In yet another aspect, an edge router is operable to be deployed in a network at an edge of a first routing protocol domain and a second routing protocol domain. The edge router is operable to be configured for fast Internet Protocol (IP) reroute. The edge router includes a forwarding plane including one or more line cards, and a control plane including one or more cards coupled with the forwarding plane. The control plane includes a first routing protocol module, corresponding to the first routing protocol domain, which is operable to determine a primary next hop in the first routing protocol domain. The control plane includes a second routing protocol module, corresponding to the second routing protocol domain, which is operable to determine a backup next hop in the second routing protocol domain. The second routing protocol module is operable to use a different routing protocol to determine the backup next hop than a routing protocol operable to be used by the first routing protocol module to determine the primary next hop. The backup next hop is to be used as a fast reroute for the primary next hop in response to a failure associated with one of a link and a network device associated with the primary next hop. The control plane further includes a controller module in communication with the first and second routing protocol modules, the controller module operable to configure a forwarding structure of the forwarding plane with the primary and backup next hops. One possible advantage of the edge router is an ability to allow a backup next hop to exist in a different routing protocol domain than its corresponding primary next hop.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Disclosed herein are methods and network devices for inter-domain fast reroute. RFC 5286 describes IP fast reroute approaches that are reported to cover only intra-domain routing. In such intra-domain routing, both the primary and backup next hops are in the same single domain or routing area. In addition, RFC 5286 describes IP fast reroute approaches that utilize a single routing protocol to determine both the primary and backup next hops. Advantageously, the inter-domain fast reroute methods, systems, and network devices disclosed herein may help to extend fast reroute to allow a backup next hop to exist in a different network domain than its corresponding primary next hop. In some embodiments, this may allow application of fast reroute, or loop free fast reroute, in deployments not achievable by the conventional IP fast reroute described in RFC 5286. In some embodiments, the inter-domain fast reroute methods, systems, and network devices disclosed herein may use different protocols (e.g., different routing protocols) to determine the primary and backup next hops, although this is not required.

In the following description, numerous specific details are set forth. For example, specific network deployments, specific routing protocols, specific mechanisms for preventing loops, specific module partitioning/integration options, and the like, are set forth. However, it is understood that embodiments of the invention may be practiced without these specific details. In other instances, well-known circuits, structures and techniques have not been shown in detail in order not to obscure the understanding of this description.

Figure 1:
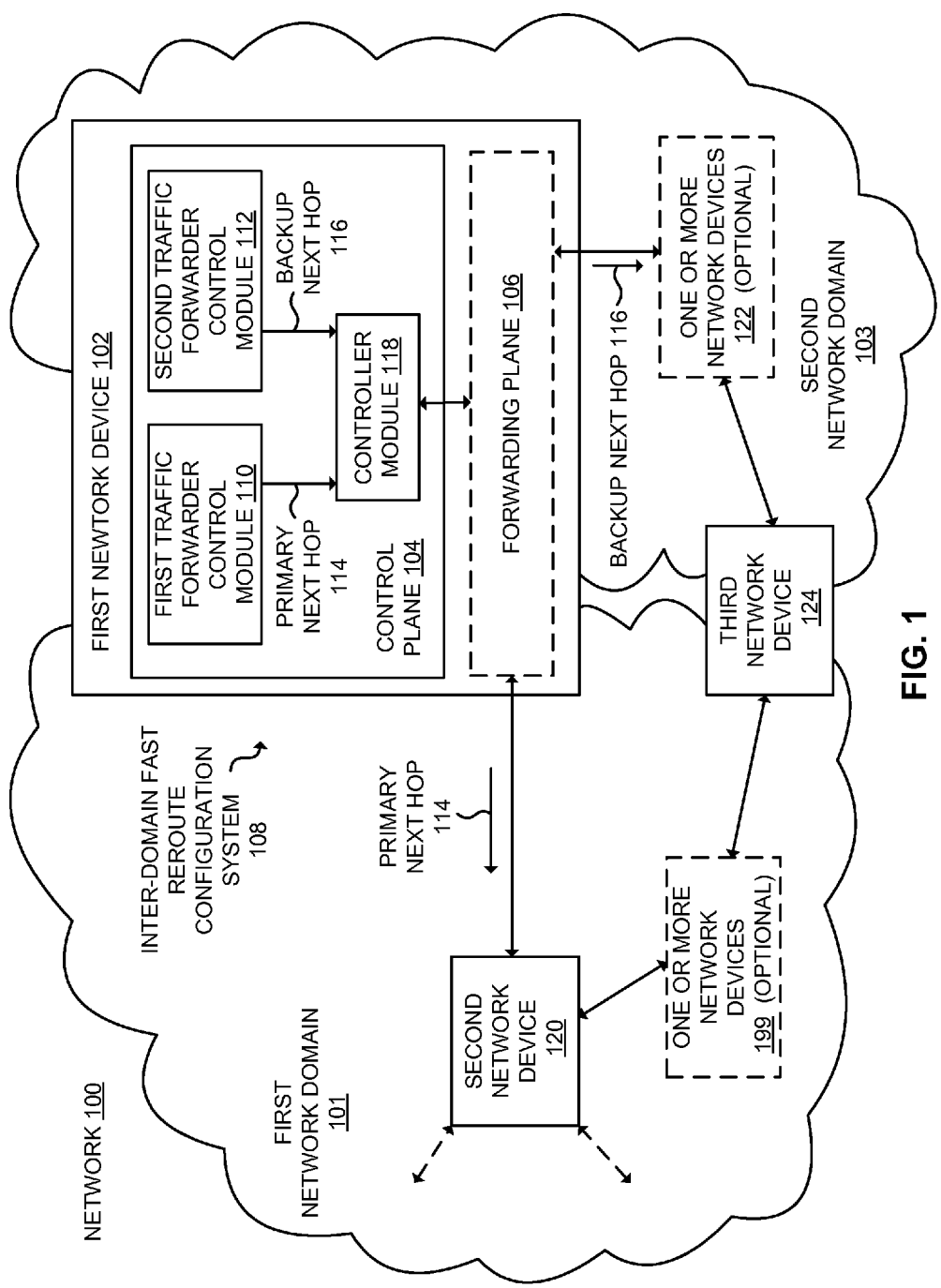
FIG. 1 is a block diagram of an embodiment of a network device operable to be configured for inter-domain fast reroute.

FIG. 1 is a block diagram of an embodiment of a first network device 102. The first network device is operable to be deployed in a network 100 coupled between a first network domain 101 and a second network domain 103. The first network device is operable to be configured (e.g., to configure itself) for inter-domain fast reroute. In some embodiments, the network device may be an edge router, or network device implementing routing functionality, although the scope of the invention is not so limited.

As used herein, a network device (e.g., a router, switch, bridge, etc.) is a piece of networking equipment, including hardware and software, that communicatively interconnects other equipment on the network (e.g., other network devices, end stations, etc.). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, geographic positioning system (GPS) units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router, or is otherwise implementing routing functionality, the control plane typically determines how data (e.g., packets) is to be routed (e.g., the next hop for the data and the outgoing port for that data), and the data plane is in charge of forwarding that data. For example, in the case that the network device is a router, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network devices to exchange routes and select those routes based on one or more routing metrics. Static routing may also optionally be used.

Routes and adjacencies may be stored in one or more routing structures or other control plane structures (e.g., Routing Information Base (RIB), Label Information Base (LIB), one or more adjacency structures) on the control plane. The control plane programs or otherwise configures the data plane with information (e.g., adjacency and route information) based on the one or more control plane structures or routing structures. For example, the control plane may program the adjacency and route information into one or more forwarding structures or other structures of the data plane (e.g., Forwarding Information Base (FIB), Label Forwarding Information Base (LFIB), and one or more adjacency structures) on the data plane. The data plane may use these forwarding and adjacency structures when forwarding traffic.

Each of the routing protocols may download route entries to a main control plane structure or routing structure (e.g., an RIB) based on certain route metrics. The metrics may be different for different routing protocols. Each of the routing protocols can store the route entries, including the route entries which are not downloaded to the main RIB, in a local RIB (e.g., an OSPF local RIB). A control plane module (e.g., an RIB manager module) that manages or controls the main RIB or other routing structure selects routes from those downloaded by the routing protocols (based on a set of metrics) and downloads those selected routes (sometimes referred to as active route entries) to the data plane. As will be described further herein, the control plane module may also download backup next hops to the forwarding plane or data plane for purposes of fast reroute. The control plane module (e.g., the RIB manager module) can also cause routes to be redistributed between routing protocols. For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more mechanisms. As one example, the cards may be coupled together by a first full mesh coupling the line cards and a second full mesh coupling all of the cards. The set of line cards make up the data plane, while the set of control cards provide the control plane and exchange packets with external network device through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Referring again to FIG. 1, the first network device 102 includes a control plane 104. The control plane may include one or more cards (e.g., one or more control cards, service cards, resource cards, or a combination thereof), which for simplicity are not shown in the illustration. The first network device also includes a forwarding plane 106 coupled with the control plane. The forwarding plane may include one or more line cards, which for simplicity are not shown in the illustration.

The first network device includes an inter-domain fast reroute configuration system 108. The inter-domain fast reroute configuration system may be operable to configure the first network device for inter-domain fast reroute. As shown, in some embodiments, the inter-domain fast reroute configuration system may be implemented on the control plane 104. The inter-domain fast reroute configuration system may be implemented by hardware, software, firmware, or a combination thereof (e.g., software operable to run on one or more control cards).

As shown, the first network device 102 may be deployed in the network 100 between the first network domain 101 and the second network domain 103. In some embodiments, the first and second network domains may each represent sub-networks including a set of network devices that use static routing rules and/or a common routing protocol to exchange information about forwarding of data using the links within that domain. Specific examples of the network domains include, but are not limited to, routing domains, routing areas, sub-networks using different routing protocols, internal BGP domains, OSPF domains, IS-IS domains, or the like. Another specific example of a network domain is a routing domain that supports Multiprotocol Label Switching (MPLS) using Label Distribution Protocol (LDP), Resource Reservation Protocol (RSVP), or a static label switched path (LSP) configuration to set up LSPs. In some embodiments, inter-domain routing or other traffic forwarding may be different than intra-domain routing or other traffic forwarding. In some embodiments, the first network domain may use a first routing protocol or other traffic forwarding protocol whereas the second network domain may use a second, different routing protocol or other traffic forwarding protocol (e.g., one may use OSPF and another may use IS-IS).

The first network device may represent an edge network device that is at the edge of the first and second network domains. This is depicted in the illustration by both network clouds overlapping the first network device. The first network device is coupled with a second network device 120 deployed in the first network domain by a primary next hop 114. The next hop through the second network device 120 may lead to a prefix or other destination in another network device either in the first network domain or in another network domain. The first network device is also coupled with one or more optional network devices 122 deployed in the second network domain by a backup next hop 116. As used herein, the term "next hop" may refer to either a physical or logical link (e.g., a tunnel) that may use any of various different technologies and/or protocols suitable for traffic forwarding. The one or more optional network devices 122 are coupled with a third network device 124. The third network device 124 may represent an edge network device. In an alternate embodiment, the first network device 102 may be coupled directly with the third edge network device 124 instead of indirectly through the one or more optional network devices 122. The third network device 124 is coupled with the second network device that is deployed in the first network domain through one or more optional intervening network devices 199. In an alternate embodiment, the third network device 124 may optionally be directly coupled with the second network device 120 instead of indirectly through the one or more optional intervening network devices 199. It is to be appreciated that these network devices may optionally have other connections to other network devices, which for simplicity of illustration and description are not shown. Notice that both the primary next hop 114 and the backup next hop 116 through the one or more optional network devices 122 and the third network device 124 provide paths or routes from the first network device 102 to the second network device 120 in the illustrated example embodiment. In alternate embodiments, the prefix or other destination associated with the primary next hop may be anywhere in the first network domain, or even in another network domain, such that the primary and backup paths need not necessarily merge at the second network device as shown in the illustration, but may remain separate/unmerged until closer to and/or at the destination.

The inter-domain fast reroute configuration system 108 includes a first traffic forwarder control module 110. The first traffic forward module 110 corresponds to the first network domain 101. The first traffic forwarder control module may learn routes and distribute routes to internal clients and external peers. The first traffic forward module 110 is operable to determine the primary next hop 114 in the first network domain 101. The primary next hop may represent a physical or logical link (e.g., a tunnel) to a suitable prefix or other destination. In some embodiments, the first traffic forwarder control module may represent a routing protocol module, or a static routing module providing the capability to configure a set of one or more static routing rules, although the scope of the invention is not so limited. Examples of suitable routing protocols include, but are not limited to, Border Gateway Protocol (BGP), Interior Gateway Protocols (IGP) such as Open Shortest Path First (OSPF), Intermediate System to Intermediate System (IS-IS), and Routing Information Protocol (RIP), Label Distribution Protocol (LDP), Resource Reservation Protocol (RSVP), other MPLS-related protocols, IGRP, EIGRP, and other routing protocols known in the arts. As another option, the module may be operable to statically configure label switched paths (LSPs). As yet another option, the first traffic forwarder control module 110 may represent a software defined network (SDN) agent module corresponding to an SDN domain that is to receive traffic forwarding control from an SDN controller module.

The inter-domain fast reroute configuration system also includes a second traffic forwarder control module 112. The second traffic forwarder control module 112 corresponds to the second network domain 103. The second traffic forwarder control module 112 is operable to determine the backup next hop 116 in the second network domain 103. The backup next hop may represent a physical or logical link (e.g., a tunnel) toward the prefix or other destination associated with the primary next hop. In some embodiments, the second traffic forwarder control module 112 may represent a routing protocol module or a static routing module including a set of one or more static routing rules, although the scope of the invention is not so limited. In some embodiments, protocols (e.g., routing protocols) used by the first and second traffic forwarder control modules may be different. Alternatively, the protocols (e.g., the routing protocols) used by the first and second traffic forwarder control modules may be the same (e.g. two instances of the same routing protocol may be used). As another option, the second traffic forwarder control module 110 may represent an SDN agent module that is to receive traffic forwarding control from an SDN controller module.

The inter-domain fast reroute configuration system also includes a controller module 118 that is coupled with, or otherwise in communication with, the first traffic forwarder control module 110 and the second traffic forwarder control module 112. The controller module may be operable to configure a forwarding plane structure and/or a forwarding structure of the forwarding plane 106 with the primary next hop 114 and the backup next hop 116. For example, the controller module may receive the primary next-hop from the first traffic forwarder control module, associated in with a given traffic class, and for the same traffic class may receive the backup next-hop from the second traffic forwarder control module. The traffic class may be classified by, for example, an address prefix or an MPLS label. The controller module may be operable to combine the primary and backup next hops as a fast reroute pair, and may be operable to program, download, or otherwise configure the fast reroute pair to the forwarding plane for subsequent use in fast reroute. The primary next hop may point to the backup next hop or otherwise indicating the backup next hop (e.g., through an indirection). In one particular example, in the case of a router or other network device implementing routing functionality, the controller module may represent an RIB manager/controller module to program the primary and backup next hops to a single entry of a forwarding information base (FIB) or other forwarding structure, although the scope of the invention is not so limited.

The first network device also includes the forwarding plane 106. The forwarding plane may have a structure (e.g., a forwarding structure) operable to store or otherwise preserve the primary and backup next hops. In addition, the forwarding plane may also be operable or capable of detecting failures associated with the primary next hop. The forwarding plane may also be capable of propagating the failure through the forwarding plane and switching to the backup next hop in response to the failure. The backup next hop may be used as a fast reroute temporary replacement for the primary next hop in response to a failure. Notice that the backup next hop leads to the second network device through the one or more optional intervening network devices and the third network device. The detection of the failure, the propagation of the failure within the forwarding plane, and the switchover from the primary to backup next hops may optionally be done within the forwarding plane using substantially conventional approaches known in the arts, or by other approaches developed in the future.

Advantageously, the inter-domain fast reroute configuration system may help to extend fast reroute to allow a backup next hop to occur in a different network domain than its corresponding primary next hop. This may be useful for various possible reasons. As a first example, the inter-domain fast reroute may potentially be used in situations and/or network deployments were conventional intra-domain fast reroute may not be able to be used. In some embodiments, for a given primary next hop in a given network domain, a backup next hop may not exist in that given network domain, but may exist in a different network domain. In other embodiments, for a given primary next hop in a given network domain, a loop free backup next hop may not exist in that given network domain for that given primary next hop, but a loop free backup may exist for that primary next hop in a different network domain. In still further embodiments, a network device and/or protocol (e.g., a protocol corresponding to a given network domain) may lack an ability to determine whether a loop free backup next hop exists in the given network domain for a given primary next hop, but the network device and/or a different protocol (e.g., a different protocol corresponding to a different network domain) may have a capability of determining whether a loop free backup next hop exists in the different network domain for the given primary next hop. The inter-domain fast reroute may potentially be used to provide a loop free fast reroute that conventional intra-domain fast reroute technology may not be able to provide, or may not be able to verify or guarantee.

Figure 2:
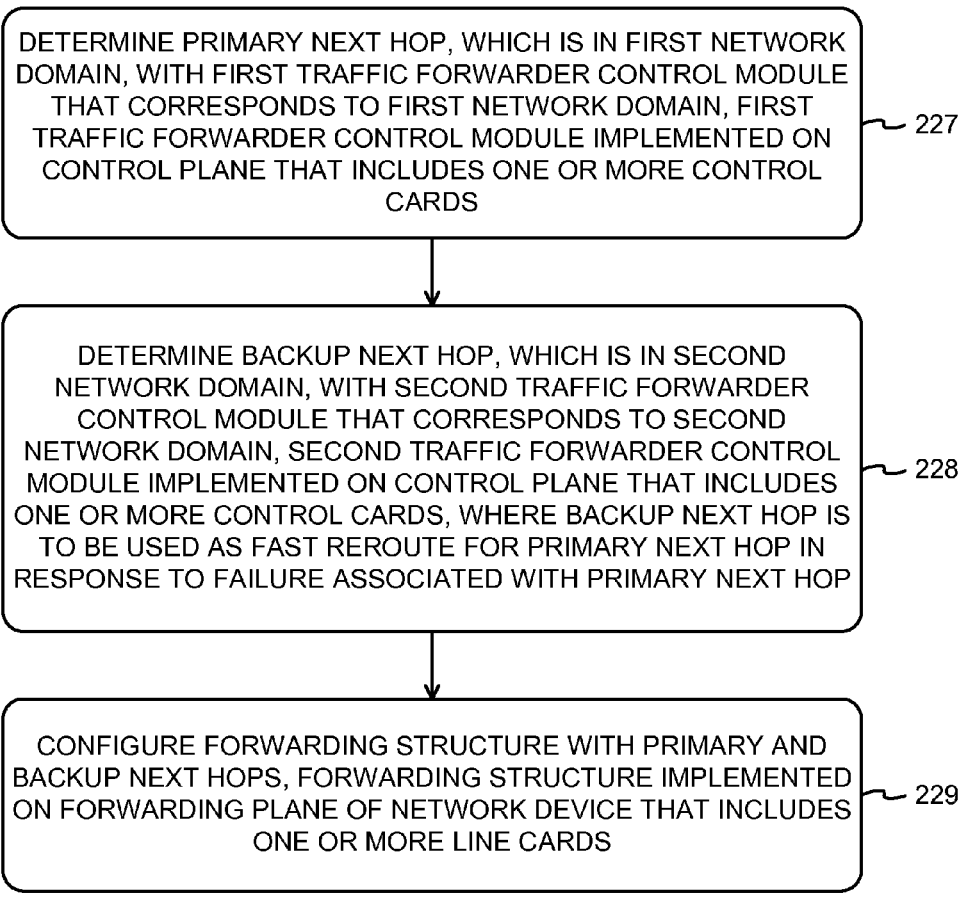
FIG. 2 is a block flow diagram of an embodiment of a method of configuring a network device for inter-domain fast reroute.

FIG. 2 is a block flow diagram of an embodiment of a method 226 that may be performed in a network device to configure the network device for inter-domain fast reroute. The method may be performed in a network device that is deployed in a network between a first network domain and a second network domain. In some embodiments, the method may be implemented in an edge router, or network device implementing routing functionality, although the scope of the invention is not so limited.

In some embodiments, the operations and/or method of FIG. 2 may be performed by and/or within the first network device 102 of FIG. 1. The components, features, and details described herein for the first network device of FIG. 1 also optionally apply to the operations and/or method of FIG. 2, which may in embodiments be performed by and/or within the first network device. Alternatively, the operations and/or method of FIG. 2 may be performed by and/or within a similar or different network device. Moreover, the first network device of FIG. 1 may perform operations and/or methods the same as, similar to, or different than those of FIG. 2.

The method includes a step of determining a primary next hop, which is in the first network domain, with a first traffic forwarder control module, which corresponds to the first network domain, at block 227. In some embodiments, the first traffic forwarder control module may represent a routing protocol module, a static routing module providing the capability to configure a set of one or more static routing rules, or an SDN agent module, although the scope of the invention is not so limited. In some embodiments, the first traffic forwarder control module may be implemented on a control plane that includes one or more cards.

The method also includes a step of determining a backup next hop, which is in the second network domain, with a second traffic forwarder control module, which corresponds to the second network domain, at block 228. In various embodiments, the second traffic forwarder control module may represent a routing protocol module, a static routing module providing the capability to configure a set of one or more static routing rules, or an SDN agent module, although the scope of the invention is not so limited. In some embodiments, protocols (e.g., routing protocols) used by the first and second traffic forwarder control modules may be different. Alternatively, the protocols (e.g., the routing protocols) used by the first and second traffic forwarder control modules may be the same. In some embodiments, the second traffic forwarder control module may be implemented on the control plane that includes the one or more cards.

The method also includes a step of configuring a data plane structure or forwarding structure with the primary and backup next hops, at block 229. For example, a controller module may combine primary and backup next-hops for the same address, prefix, MPLS label, or other traffic classification as a fast reroute pair, and may program, download, or otherwise configure the fast reroute pair to the forwarding plane. In one particular example, in a method performed in a router, or a network device implementing routing functionality, a routing information base (RIB) manager module may store the primary and backup next hops in an entry of a forwarding information base (FIB) or other structure on the forwarding plane, although the scope of the invention is not so limited.

Advantageously, the method may allow a network device to be configured for inter-domain fast reroute, which may allow a backup next hop to occur in a different network domain than its corresponding primary next hop. In some embodiments, this may allow the inter-domain fast reroute to be used in environments and/or network device deployments that cannot be handled by conventional intra-domain fast reroute. In other embodiments, the inter-domain fast reroute may potentially be used to provide a loop free fast reroute that conventional intra-domain fast reroute technology may not be able to provide, or may not be able to verify or guarantee.

Figure 3A:
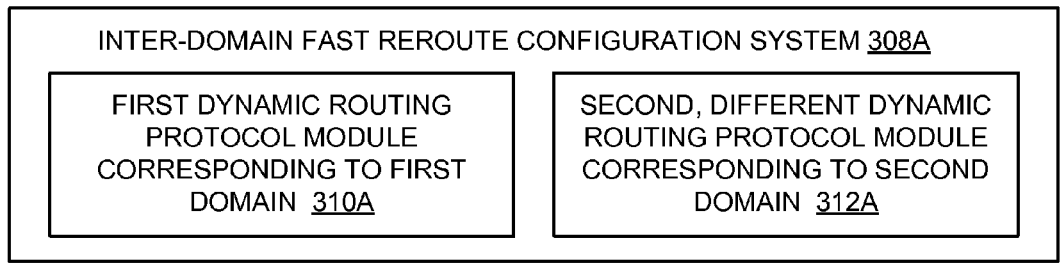
FIG. 3A-3D are a block diagrams of embodiments of inter-domain fast reroute configuration systems including different embodiments of pairs of traffic forwarder control modules.

FIG. 3A is a block diagram of a first embodiment of an inter-domain fast reroute configuration system 308A including a first embodiment of a pair of traffic forwarder control modules. This first embodiment includes dynamic routing protocol modules of different types that correspond to different network domains. A first dynamic routing protocol module 310A corresponds to a first network domain. A second, different dynamic routing protocol module 312A corresponds to a second network domain. In some embodiments, the first and second dynamic routing protocol modules may be operable to use different types of dynamic routing protocols to determine the primary and backup next hops. For example, one of the dynamic routing protocol modules may be operable to use BGP, whereas another may be operable to use one of OSPF, IS-IS, RIP, LDP, or RSVP. As another example, one of the dynamic routing protocol modules may be operable to use OSPF, whereas the other may be operable to use one of BGP, IS-IS, RIP, LDP, or RSVP. This first embodiment may represent a multiple protocol inter-domain fast reroute configuration system, since it uses two or more different protocols.

Figure 3B:
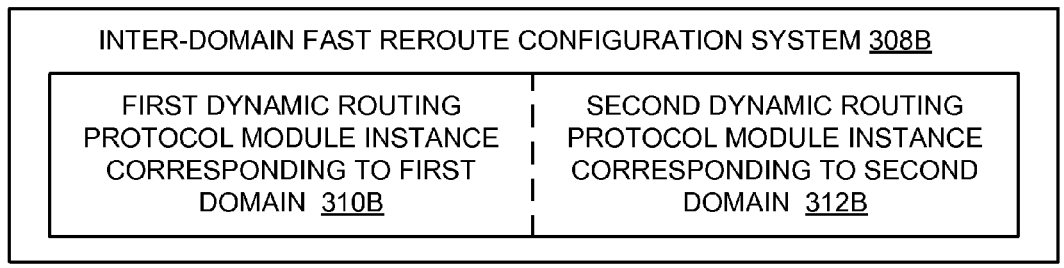

FIG. 3B is a block diagram of a second embodiment of an inter-domain fast reroute configuration system 308B including a second embodiment of a pair of traffic forwarder control modules. This second embodiment includes first and second dynamic routing protocol module instances, of a same dynamic routing protocol, which correspond to different network domains. A first dynamic routing protocol module instance 310B corresponds to a first network domain and implements a dynamic routing protocol. A second dynamic routing protocol module instance 312B corresponds to a second network domain and implements the same dynamic routing protocol. In some embodiments, the first and second dynamic routing protocol module instances may be operable to use the same dynamic routing protocol to determine the primary and backup next hops, but the dynamic routing protocol may be employed selectively only within a respective network domain. For example, the first dynamic routing protocol module instance 310B may be operable to use any one of OSPF, IS-IS, RIP, BGP, LDP, and RSVP to determine the primary next hop within the first network domain, whereas the second dynamic routing protocol module instance 312B may be operable to use the same protocol to determine the backup next hop within the second network domain. This second embodiment may represent a single protocol inter-domain fast reroute configuration system, since it uses a single protocol.

Figure 3C:
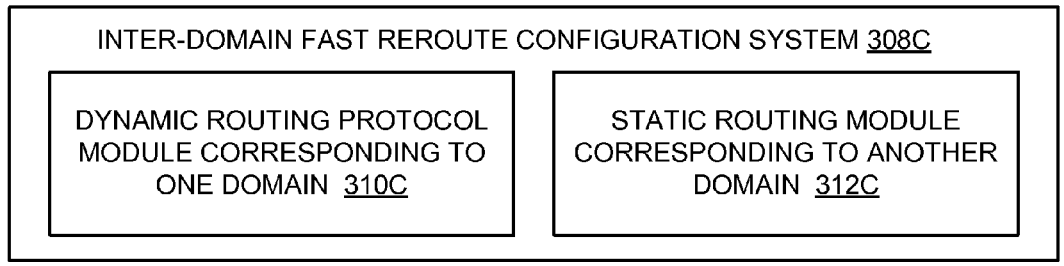

FIG. 3C is a block diagram of a third embodiment of an inter-domain fast reroute configuration system 308C including a third embodiment of a pair of traffic forwarder control modules. This third embodiment includes a dynamic routing protocol module 310C corresponding to a first network domain and a static routing module 312C corresponding to a second network domain. The dynamic routing protocol modules may use any of the suitable dynamic routing protocols discloses herein. The static routing module may include a set of one or more static routing rules (e.g., static routing rules preconfigured by a practitioner).

Figure 3D:
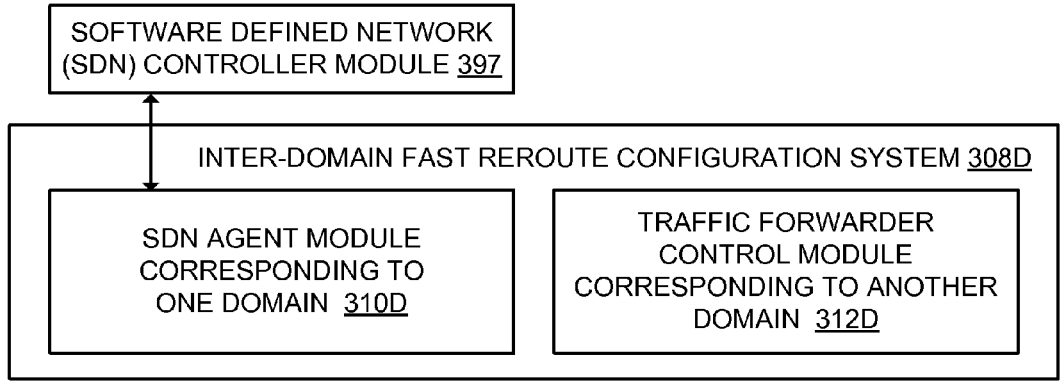

FIG. 3D is a block diagram of a fourth embodiment of an inter-domain fast reroute configuration system 308D including a fourth embodiment of a pair of traffic forwarder control modules. This fourth embodiment includes a software defined network (SDN) agent module 310D that corresponds to a first network domain. The first network domain may represent an SDN domain. An SDN controller module 397 is coupled, or otherwise in communication with, the SDN agent module 310D. The SDN controller module may control the forwarding of the routers, switches, or other network devices within the SDN domain. In some embodiments, the SDN controller module may select a next hop, for example a primary next hop and/or a backup next hop, and may provide the selected next hop(s) to the SDN agent module. By way of example, the SDN controller module may be hosted within one of the routers in the SDN domain, or within a separate device. In some embodiments, the inter-domain fast reroute configuration system 308D may also include a traffic forwarder control module 312D corresponding to a second network domain. The traffic forwarder control module 312D may include another of the previously mentioned types of traffic forwarder control modules, such as, for example, a dynamic routing protocol module, a static routing module, or another SDN controller module.

FIGS. 3A-D show four different embodiments of pairs of traffic forwarder control modules. In some embodiments, any of these different embodiments may be used in the first network device 102 of FIG. 1 and/or may be used to perform the method of FIG. 2.

Figure 4:
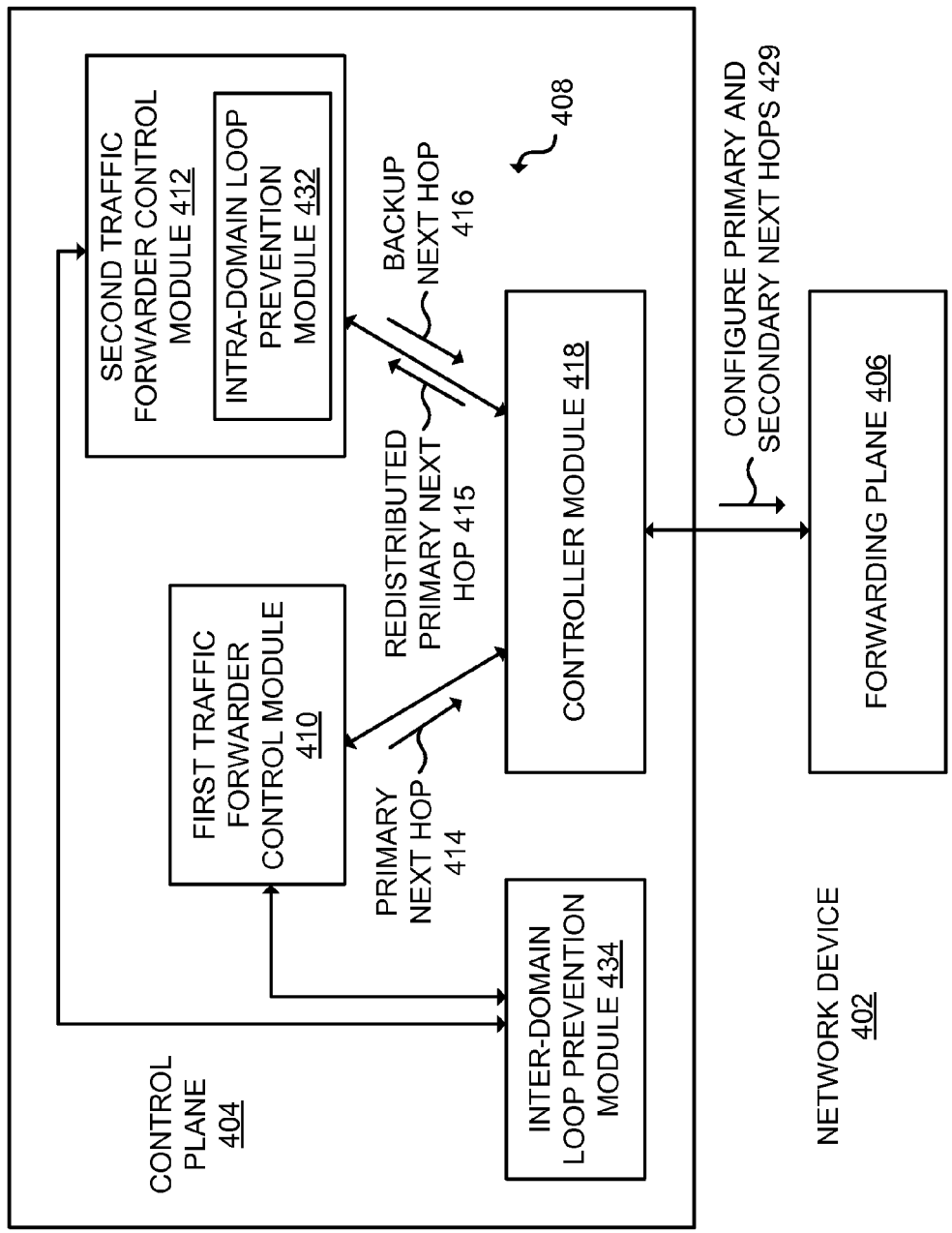
FIG. 4 is a block diagram of an embodiment of a network device that includes an intra-domain loop prevention module and an inter-domain loop prevention module.

FIG. 4 is a block diagram of an embodiment of a network device 402 that includes an inter-domain fast reroute configuration system 408 that includes an intra-domain loop prevention module 432 and an inter-domain loop prevention module 434. The network device is operable to be deployed in a network between a first network domain and a second network domain (not shown). The first network device is operable to be configured (e.g., to configure itself) for inter-domain fast reroute. In some embodiments, the network device may be an edge router, or edge network device implementing routing functionality, although the scope of the invention is not so limited. In some embodiments, any of the optional additional details of FIG. 4 may be used in the first network device 102 of FIG. 1 and/or may be used to perform the method of FIG. 2.

The network device 402 includes a control plane 404, a forwarding plane 406, an inter-domain fast reroute configuration system 408, a first traffic forwarder control module 410, a second traffic forwarder control module 412, and a controller module 418. Unless otherwise specified, the control plane, the forwarding plane, the first traffic forwarder control module, the second traffic forwarder control module, and the controller module of FIG. 4 may have any of the aforementioned optional characteristics as the correspondingly named components of FIG. 1. To avoid obscuring the description, the different and/or additional characteristics will primarily be described without repeating the characteristics that may optionally be the same.

The first traffic forwarder control module 410 may provide a primary next hop 414 to the controller module 418. The controller module 418 may redistribute 415 the primary next hop 414 to the second traffic forwarder control module 412. The second traffic forwarder control module 412 may determine and provide a corresponding backup next hop 416 to the controller module 418. The controller module may configure 429 the primary and backup next hops to the forwarding plane 406.

In some embodiments, the network device 402 and/or the inter-domain fast reroute configuration system 408 may include one or more of the intra-domain loop prevention module 432 and/or the inter-domain loop prevention module 434. Each of these modules may be operable to help prevent, or at least reduce the likelihood of, data traffic loops. Representatively, the data traffic loops may represent situations where data traffic is sent in two opposite directions between two network devices, or otherwise loops back and forth between two network devices. In other embodiments, one but not both of the intra-domain and inter-domain loop prevention modules may optionally be included.

The intra-domain loop prevention module 432 may be operable to help prevent, or at least reduce the likelihood of, loops in a network domain corresponding to the second traffic forwarder control module 412. As shown, in some embodiments, the intra-domain loop prevention module 432 may be a part of the second traffic forwarder control module 412. Alternatively, the intra-domain loop prevention module may be separate from, but in communication with, the second traffic forwarder control module.

After receiving an indication of the primary next hop, the intra-domain loop prevention module may be operable to determine whether or not any of the possible backup next hops, as determined by the second traffic forwarder control module, provide or represent loop free backup next hops, which do not create data traffic loops within the network domain corresponding to the second traffic forwarder control module. These calculations may be intra-domain within the respective network domain, as opposed to inter-domain. In some embodiments, if a loop free backup next hop exists, it may be provided to the controller module 418. Alternatively, in some embodiments, if a backup next hop is not a loop free backup next hop, then it may not be provided to the controller module 418.

Various different approaches are suitable for determining whether or not a backup next hop provides a loop free backup next hop within a given network domain. As one example, Loop Free Alternates (LFA) and/or remote LFAs are suitable for Interior Gateway Protocols (IGPs), such as, for example, OSPF and IS-IS. By way of example, an IGP running within a router may build a database that tracks all links with the applicable network area, and a LFA module and/or remote LFA module may attempt to compute one or more loop free alternate routes, or remote loop free alternative routes, using the IGP data base. As another example, BGP diverse path, BGP best external, and BGP add path are suitable BGP technologies for the BGP routing protocol to distribute and learn loop free alternate routes for a single prefix. Such a BGP module may help to prevent or at least reduce loops. As yet another example, a module may employ a Maximally Redundant Trees algorithm, or other related algorithm, which is based on knowledge of the topology of a network provided by an IGP, in order to help reduce or prevent loops.

Referring again to FIG. 4, the network device also includes the inter-domain loop prevention module 434. The inter-domain loop prevention module 434 may be operable to help prevent loops, or at least reduce the likelihood of loops, in two or more adjoining network domains, such as, for example, a first network domain corresponding to the first traffic forwarder control module 410 and a second network domain corresponding to the second traffic forwarder control module 412. As shown, in some embodiments, the inter-domain loop prevention module may be coupled with, or otherwise in communication with, each of the first and second traffic forwarder control modules. Alternatively, rather than a separate module, distributed modules distributed among the first and second traffic forwarding modules and/or the controller module may be used and may be coupled or in communication with one another to achieve the inter-domain loop prevention.

In some embodiments, the inter-domain loop prevention module 434 may be operable to control how address prefixes, routes, routing information, or other traffic forwarding information is distributed between the different network domains (e.g., distributed between the first and second traffic forwarding modules). In some embodiments, a given address prefix may be considered to be "owned" or assigned to by a corresponding given domain in which, or beyond which, that given address prefix resides. The inter-domain loop prevention module may implement a policy, stipulating that routes for that given prefix may be distributed from the given domain owning that given prefix to other domains but are not to be distributed from the other domains back to the given domain that owns, or has assigned thereto, that given prefix. Rather, one-way distribution from the domain that owns that given prefix should be enforced. Mutual route distribution may be used across the routing domains, but for a given address prefix the policy may ensure, such as, for example, through a route filter sub-module of the inter-domain loop prevention module, that the given prefix is only distributed in a one direction between the domains. For example, the inter-domain loop prevention module may be operable to prevent a prefix corresponding to the primary next hop, which has been provided from the first traffic forwarder control module to the second traffic forwarder control module, from subsequently being provided in the opposite direction from the second traffic forwarder control module back to the first traffic forwarder control module.

In some embodiments, the inter-domain loop prevention module may implement a policy to determine, for a given traffic forwarding module, whether an external route or next hop redistributed from another traffic forwarding module is the best route or next hop or whether an internal route or next hop within the corresponding network domain is better. In some embodiments, the inter-domain loop prevention module may implement a policy that, when multiple routes or next hops for a given prefix are available in an edge network device, the given domain that owns that given prefix will be used for data forwarding. For example, in some embodiments, the redistributed route may be made to be the best by giving it the most favorable metric(s). Alternatively, the redistributed route may be made to be the worst by giving it the least favorable metric(s). Either approach may help to cause forwarding of the data to its domain of origin to always be favored and may help to avoid loops in which data is sent back and forth between two domains.

Figure 5:
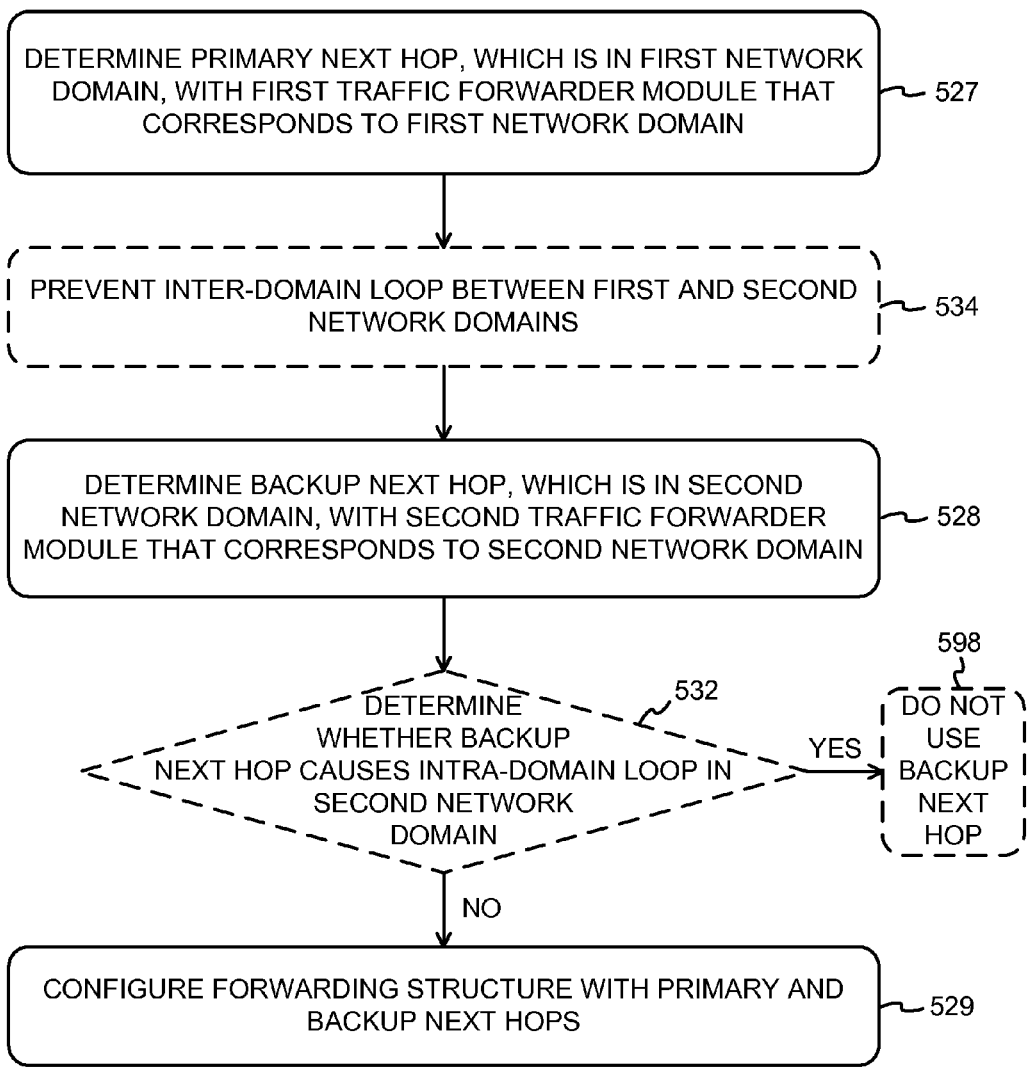
FIG. 5 is a block flow diagram of an embodiment of a method of configuring network device for inter-domain fast reroute that includes intra-domain and inter-domain loop prevention.

FIG. 5 is a block flow diagram of an embodiment of a method 526 of configuring a network device for inter-domain fast reroute that includes intra-domain and inter-domain loop prevention. The method may be performed in a network device deployed in a network between a first network domain and a second network domain.

In some embodiments, the operations and/or method of FIG. 5 may be performed by and/or within the first network device 102 of FIG. 1 and/or the network device of FIG. 4. The components, features, and details described herein for the first network device of FIG. 1 and/or the network device of FIG. 4 also optionally apply to the operations and/or method of FIG. 5, which may in embodiments be performed by and/or within such a network device. Alternatively, the operations and/or method of FIG. 5 may be performed by and/or within a similar or different network device. Moreover, the first network device of FIG. 1 and/or the network device of FIG. 4 may perform operations and/or methods the same as, similar to, or different than those of FIG. 5. Moreover, the optional details described for the method of FIG. 2 may also optionally apply to the method of FIG. 5.

The method includes a step of determining a primary next hop, which is in the first network domain, with a first traffic forwarder control module, which corresponds to the first network domain, at block 527.

The method also includes an optional step of preventing an inter-domain loop between the first and second network domains involving the primary next hop, at block 534. In some embodiments, this may include controlling how the primary next hop, a prefix associated with the primary next hop, a route or routing information associated with the primary next hop, or other traffic forwarding information is distributed between the different network domains (e.g., distributed between the first and second traffic forwarding modules). For example, this may include implementing a policy that routes for a given set of prefixes are to be distributed from a given network domain owning that given set of prefixes to other domains but are not to be distributed from the other domains back to the given domain that owns that given set of prefixes. For example, if a given set of prefix is owned by a first network domain, redistribution may occur from the first network domain to a second network domain for that prefix but the policy may prevent redistribution from the second network domain to the first network domain for that prefix.

The method also includes a step of determining a backup next hop, which is in the second network domain, with a second traffic forwarder control module, which corresponds to the second network domain, at block 528.

The method also includes an optional step of determining whether the backup next hop causes an intra-domain loop within the second network domain, at block 532. In various embodiments, this may include performing Loop Free Alternates (LFA), remote LFAs, BGP diverse path, BGP best external, and BGP add path, or Maximally Redundant Trees calculations, or other intra-domain loop calculations known in the arts.

In some embodiments, this may include implementing a policy to determine, for a given traffic forwarding module, whether an external route or next hop redistributed from another traffic forwarding module is the best route or next hop or whether an internal route or next hop within the corresponding network domain is better. In some embodiments, this may include implementing a policy that, when multiple routes or next hops for a given prefix are available in an edge network device, a given domain that owns that given prefix will be used for data forwarding.

If the determination is that the backup next hop does provide an intra-domain loop (i.e., "yes" is the determination), then the method may advance to block 598. At block 598, it may be determined not to use the backup next hop. In such an embodiment, only loop free backup next hops will be used. Alternatively, if the determination is that the backup next hop does not provide an intra-domain loop (i.e., "no" is the determination), then the method may advance to block 529.

The method also includes a step of configuring a data plane structure or forwarding structure with the primary and backup next hops, at block 529. This may be done as described elsewhere herein.

It is to be appreciated that this is just one illustrative example of a suitable method. Other embodiments may omit the loop prevention of either one or both of blocks 532 and 534.

Figure 6:
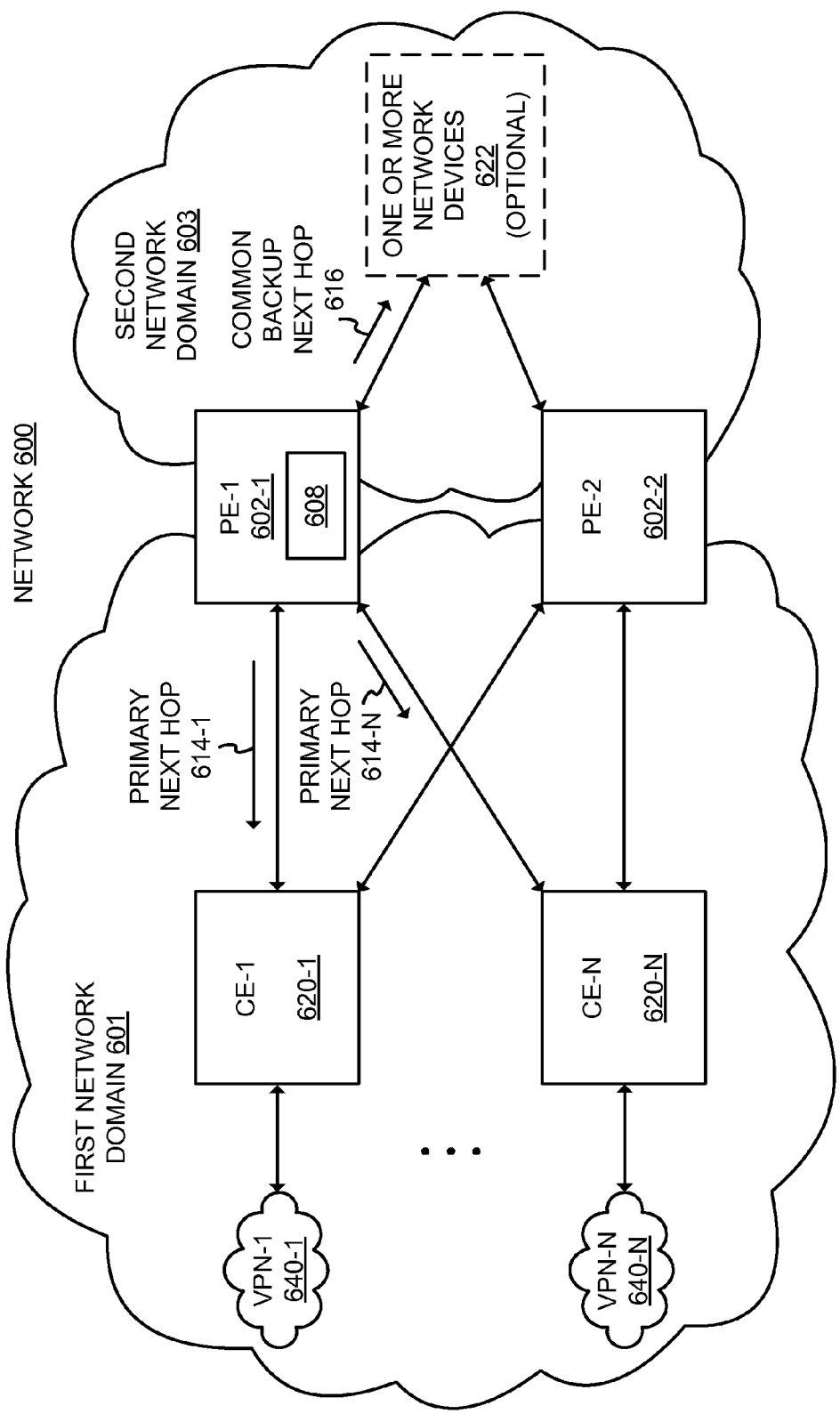
FIG. 6 is a first embodiment of a network in which embodiments may be implemented.

FIG. 6 is a first embodiment of a network 600 in which embodiments may be implemented. Some network devices provide support for implementing Virtual Private Networks (VPNs). These VPNs may be Layer 2 VPNs and/or Layer 3 VPNs. For example, network devices at the point where a provider's network and a customer's network are coupled are respectively referred to as a Provider Edge network device (PE) and a Customer Edge network device (CE). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE, and a VPN context may be configured with a VPN protocol.

Referring again to the illustration, the network includes a first network domain 601 and a second network domain 603. The first network domain includes a VPN-1 640-1, through a VPN-N 640-N. The VPN 640 are coupled through respective customer edge network devices (CE) 620. In particular, the VPN-1 640-1 is coupled with CE-1 620-1, up through the VPN-N 640-N is coupled with a CE-N 620-N. The CE 620 are coupled with PE 602. In particular, PE-1 602-1 is coupled with each of CE 620-1 through 620-N, and a PE-2 602-2 is coupled with each of the CE 620-1 through 620-N. While in the illustration a single first network domain 601 is shown, in VPN each customer's CE network device(s) may belong to a customer network domain. The provider may couple the CE network devices belonging to the same customer, through the provider's network domain (i.e., the second network domain 603) and thereby create the respective customer VPN. Each CE device may belong to a corresponding VPN. The VPN may extend across different CE devices coupled over the provider network (i.e., the second network domain 603). The second network domain also optionally includes one or more intervening network devices 622 coupled between PE-1 and PE-2. As another option, PE-1 and PE-2 may additionally or alternatively be directly coupled with one another in addition to, or instead of, being indirectly coupled.

In some embodiments, the second network domain may implement BGP and multi-protocol label switching (MPLS), although this is not required. In some embodiments, the connection between CEs and PEs may be IP over multi-chassis link aggregation (MC-LAG), in which case the same logical IP interface may be used for both PE-1 and PE-2. From the CE point of view, PE-1 and PE-2 may constitute a single logical entity. In some embodiments, routing between CE and PEs may use a dynamic routing protocol, for example OSPF, IS-IS, RIP, or BGP, or may be configured by static routes. Taking the perspective of the router PE-1, there are two routes to each CE router and to any prefix that CE advertises, or which is configured as a static route with CE as next-hop. First, there is a direct route to each CE from PE-1. Second, there is an indirect route to each CE through the PE-2.

In some embodiments, the PE-1 602-1 may optionally include an embodiment of an inter-domain fast reroute configuration system 608. Any of the inter-domain fast reroute configuration systems disclosed herein are suitable. In some embodiments, the inter-domain fast reroute configuration system may determine a common backup next hop 616 to be used for each of primary next hops 614-1 through 614-N. As shown, in some embodiments, the common backup next hop may be to the one or more intervening optional network devices 622 and may lead to the CE 620 through PE-2. Advantageously, in some embodiments, this may allow fast reroute without needing to use multiple CE-specific links between PE-1 and PE-2. The inclusion of multiple CE-specific links, for example a first link for VPN-1 between PE-1 and PE-2 through the network device(s) 622, up through an Nth link for VPN-N between PE-1 and PE-2 through the network device(s) 622, especially when the second network domain is in the providers network, may tend to be inefficient.

Figure 7:
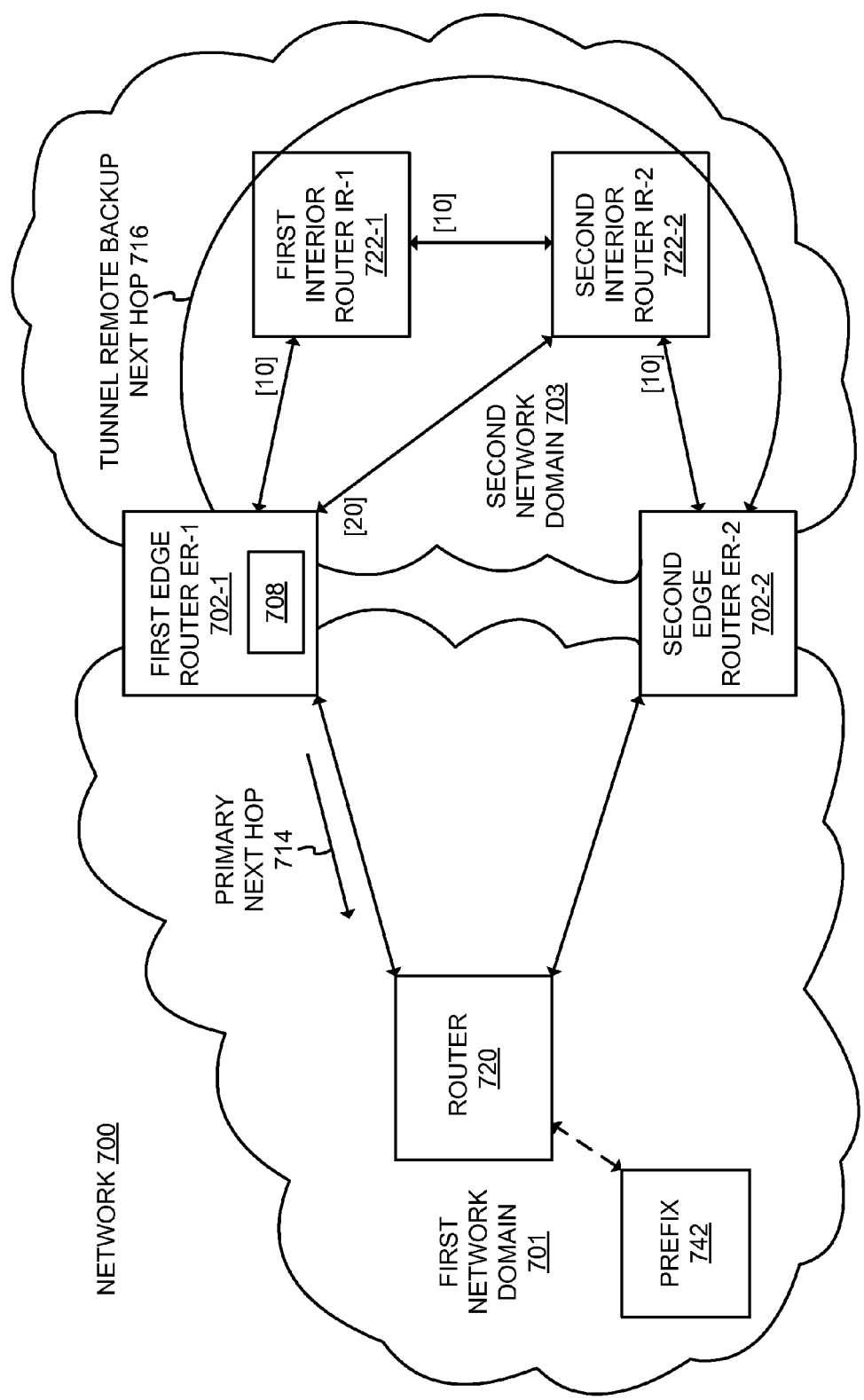
FIG. 7 is a second embodiment of a network in which embodiments may be implemented.

FIG. 7 is a second embodiment of a network 700 in which embodiments may be implemented. The network includes a first network domain 701 and a second network domain 703. The first network domain includes a prefix 742 reachable through at least a router 720. The second network domain includes a first edge router ER-1 702-1, a second edge router ER-2 702-2, a first interior router 722-1, and a second interior router 722-2. The routers are coupled by bi-directional arrows as shown in the illustration. This is just one illustrative example of a suitable network. Other networks may include other numbers and couplings of routers. In the illustration, costs or metrics associated with routing between adjacent routers on a link are shown in brackets (e.g., [10], [20], etc.).

In some embodiments, the first network domain 701 may implement a first dynamic routing protocol, such as, for example, OSPF, whereas the second network domain 703 may implement a second, different dynamic routing protocol, such as, for example, IS-IS. The first edge router ER-1 702-1 may include an inter-domain fast reroute configuration system 708. In some embodiments, the second edge router ER-2 702-2 may similarly include an inter-domain fast reroute configuration system (not shown). The configuration system 708 may include two different types of dynamic routing protocol modules each interfacing to a different one of the first and second network domains. For example, an OSPF module may interface to the first network domain and an IS-IS module may interface to the second network domain. By way of example, this use case is applicable to a deployment using a core IS-IS domain and OSPF in one or more POP (Point Of Presence) domains.

The inter-domain fast reroute configuration system 708 may assist with inter-domain fast reroute. The configuration system 708 may determine a primary next hop to the prefix 742 using a direct link coupling ER-1 702-1 to router 720. As shown in the illustration, in some embodiments, there may be no backup next hop to the prefix 742 within the first network domain (e.g., in an OSPF routing domain), but there may be one or more possible backup next hops to the prefix 742 in the second network domain (e.g., in an IS-IS routing domain). In some embodiments, the prefix 742 may be redistributed from the dynamic routing protocol corresponding to the first network domain (e.g., OSPF) to the dynamic routing protocol corresponding to the second network domain (e.g., IS-IS) in ER-1 and ER-2. By way of example, the dynamic routing protocol corresponding to the second network domain (e.g., IS-IS) in each of these edge network devices may learn of the existence of a possible backup path to the prefix 742 through ER-2. The IS-IS may attempt to compute a backup next hop when the primary next hop to the prefix 742 is received through redistribution.

In some embodiments, the router 702-1 may use suitable technology to compute the backup next hop with intra-domain loop prevention. For example, normal LFA or remote LFA may be used. As shown, in some embodiments, a tunnel remote backup next hop 716 (e.g., a Multi Protocol Label Switching (MPLS) tunnel set up either using label distribution protocol (LDP) or Resource Reservation Protocol (RSVP)) may be selected to help prevent an intra-domain loop within the second network domain. By way of example, without such a tunnel, if traffic is forwarded from the first edge router ER-1 702-1 to the first interior router IR-1 722-1, this first interior router IR-1 may attempt to forward the traffic back to the first edge router ER-1 based on the costs/metrics shown in brackets in the illustration. This would represent a loop within the second network domain and is generally undesirable. However, the tunnel may direct the traffic through the second interior router IR-2 722-2 and the second edge router ER-2 702-2 to the router 720.

In some embodiments, the same prefix may be received through both routing domains (e.g., OSPF and IS-IS) by use of mutual route redistribution with an inter-domain loop preventing policy. As one example, an inter-domain loop prevention module of the configuration system 708 may have a prefix filter to ensure that a route for a specific prefix (e.g., prefix 742) is not distributed in both directions across the inter-domain boundary between the first and second network domains. For example, in an embodiment with multiple POPs, IS-IS may distribute routes learned from one to another OSPF POP, while the OSPF POPs do not distribute external (e.g., type 1 and 2) routes back to the IS-IS core.

Having described embodiment(s) of the invention, various alternative embodiment(s) are also contemplated. While embodiments have been described in relation to two different network domains, other embodiments may use three or more different network domains. In addition, while embodiments have been described in relation to routing, other embodiments may use other forms of traffic forwarding. Still other embodiments may use other protocols besides those disclosed herein, such as equivalent or known substitute protocols, future extensions of these protocols, or future replacements for these protocols to be developed in the future.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. Those skilled in the art will recognize that the invention can be practiced with modification and alteration within the spirit and scope of the appended claims. The description is thus to be regarded as illustrative instead of limiting. The scope of the invention is not to be determined by the specific examples provided above but only by the claims below.

In other instances, well-known circuits, structures, devices, and operations have been shown in block diagram form or without detail in order to avoid obscuring the understanding of the description. Further, where considered appropriate, reference numerals or terminal portions of reference numerals have been repeated among the figures to indicate corresponding or analogous elements, which may optionally have similar characteristics.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Various operations and methods have been described. Some of the methods have been described in a basic form in the flow diagrams, but operations may optionally be added to and/or removed from the methods. In addition, while the flow diagrams show a particular order of the operations according to example embodiments, it is to be understood that that particular order is exemplary. Alternate embodiments may optionally perform the operations in different order, combine certain operations, overlap certain operations, etc. Many modifications and adaptations may be made to the methods and are contemplated. The components, features, and specific optional details described herein for an apparatus also optionally apply to the methods described herein which may in embodiments be performed by and/or with such an apparatus.

Different embodiments of the invention may be implemented using different combinations of software, firmware, and/or hardware. Thus, the techniques shown in the figures can be implemented using code and data stored and executed on one or more electronic devices (e.g., an end station, a network device).

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

What is claimed is:

1. A network device, which is operable to be deployed in a network between a first network domain and a second network domain, and which is operable to be configured for fast reroute, the network device comprising:
    a forwarding plane including one or more line cards; and
    a control plane including one or more cards coupled with the forwarding plane, the control plane including:
        a first traffic forwarder control module, corresponding to the first network domain, which is operable to determine a primary next hop in the first network domain;
        a second traffic forwarder control module, corresponding to the second network domain, which is operable to determine a backup next hop in the second network domain, wherein the backup next hop is to be used as a fast reroute for the primary next hop in response to a failure associated with the primary next hop, wherein the second traffic forwarder control module further includes an intra-domain loop prevention module operable to prevent an inter-domain traffic forwarding loop between the first network domain and the second network domain, the intra-domain loop prevention module operable to prevent an address prefix assigned to the first network domain from being distributed from the second traffic forwarder control module that corresponds to the second network domain to the first traffic forwarder control module that corresponds to the first network domain; and
        a controller module in communication with the first and second traffic forwarder control modules, the controller module operable to configure a forwarding structure of the forwarding plane with the primary and backup next hops.

2. The network device of claim 1, wherein the first traffic forwarder control module comprises a first dynamic routing protocol module, and wherein the second traffic forwarder control module comprises a second dynamic routing protocol module.

3. The network device of claim 2, wherein the first and second dynamic routing protocol modules are operable to determine the primary and backup next hops with different dynamic routing protocols.

4. The network device of claim 3, wherein the first dynamic routing protocol module is operable to determine the primary next hop with a dynamic routing protocol that is not supported by the second network domain.

5. The network device of claim 2, wherein the first and second dynamic routing protocol modules are operable to determine the primary and backup next hops with different instances of a same dynamic routing protocol employed within a corresponding network domain, wherein the same dynamic routing protocol employed is one of Open Shortest Path First (OSPF), Intermediate System to Intermediate System (IS-IS), Routing Information Protocol (RIP), Label Distribution Protocol (LDP), Resource Reservation Protocol (RSVP), Software Defined Network (SDN), and Border Gateway Protocol (BGP).

6. The network device of claim 1, wherein one of the first and second traffic forwarder control modules comprises a dynamic routing protocol module and another of the first and second traffic forwarder control modules comprises a set of one or more static routing rules.

7. The network device of claim 1, wherein the second traffic forwarder control module is operable to receive the primary next hop, and is operable to determine that the backup next hop provides a loop free backup, within the second network domain, for the primary next hop.

8. The network device of claim 1, wherein the first traffic forwarder control module is operable to determine the primary next hop using a protocol that is different than a protocol used by the second traffic forwarder control module to determine the backup next hop.

9. A method, in a network device that is deployed in a network between a first network domain and a second network domain, of configuring the network device for fast reroute, the method comprising steps of:
determining a primary next hop, which is in the first network domain, with a first traffic forwarder control module that corresponds to the first network domain, the first traffic forwarder control module implemented on a control plane that includes one or more control cards;
determining a backup next hop, which is in the second network domain, with a second traffic forwarder control module that corresponds to the second network domain, the second traffic forwarder control module implemented on the control plane that includes the one or more control cards, wherein the backup next hop is to be used as a fast reroute for the primary next hop in response to a failure associated with the primary next hop;
configuring a forwarding structure with the primary and backup next hops, the forwarding structure implemented on a forwarding plane of the network device that includes one or more line cards; and
preventing an inter-domain traffic forwarding loop between the first network domain and the second network domain, the preventing comprising preventing an address prefix assigned to the first network domain from being distributed from the second traffic forwarder control module that corresponds to the second network domain to the first traffic forwarder control module that corresponds to the first network domain.

10. The method of claim 9, wherein the step of determining the primary next hop comprises determining the primary next hop with a first dynamic routing protocol module, and wherein the step of determining the backup next hop comprises determining the backup next hop with a second dynamic routing protocol module.

11. The method of claim 10, wherein the steps of determining the primary and backup next hops comprises determining the primary and backup next hops with different dynamic routing protocols.

12. The method of claim 11, wherein the step of determining the primary next hop comprises determining the primary next hop with a dynamic routing protocol that is not supported by the second network domain.

13. The method of claim 10, wherein the steps of determining the primary and backup next hops comprises determining the primary and backup next hops with different instances of a same dynamic routing protocol employed by each of the first and second dynamic routing protocol modules within a corresponding network domain, wherein the same dynamic routing protocol employed is one of Open Shortest Path First (OSPF), Intermediate System to Intermediate System (IS-IS), Routing Information Protocol (RIP), Label Distribution Protocol (LDP), Resource Reservation Protocol (RSVP), Software Defined Network (SDN), and Border Gateway Protocol (BGP).

14. The method of claim 9, wherein the step of determining one of the primary and backup next hops is performed with a dynamic routing protocol module and the step of determining another of the primary and backup next hops is performed with a set of one or more static routing rules.

15. The method of claim 9, further comprising steps of:
providing the primary next hop to the second traffic forwarder control module; and
determining, with the second traffic forwarder control module, that the backup next hop provides a loop free backup, within the second network domain, for the primary next hop.

16. The method of claim 9, wherein at least one of the following is true:
a backup next hop does not exist for the primary next hop in the first network domain;
a loop free backup next hop does not exist for the primary next hop in the first network domain; and
the network device lacks a capability to determine whether a loop free backup next hop exists in the first network domain for the primary next hop.

17. An edge router, which is operable to be deployed in a network at an edge of a first routing protocol domain and a second routing protocol domain, and which is operable to be configured for fast Internet Protocol (IP) reroute, the edge router comprising:
a forwarding plane including one or more line cards; and
a control plane including one or more cards coupled with the forwarding plane, the control plane including:
a first routing protocol module, corresponding to the first routing protocol domain, which is operable to determine a primary next hop in the first routing protocol domain;
a second routing protocol module, corresponding to the second routing protocol domain, which is operable to determine a backup next hop in the second routing protocol domain, wherein the second routing protocol module is operable to use a different routing protocol to determine the backup next hop than a routing protocol operable to be used by the first routing protocol module to determine the primary next hop, and wherein the backup next hop is to be used as a fast reroute for the primary next hop in response to a failure associated with one of a link and a network device associated with the primary next hop, wherein the second routing protocol module includes an intra-domain loop prevention module operable to prevent an inter-domain traffic forwarding loop between the first routing protocol domain and the second routing protocol domain, the intra-domain loop prevention module operable to prevent an address prefix assigned to the first routing protocol domain from being distributed from the second routing protocol module that corresponds to the second routing protocol domain to the first routing protocol module that corresponds to the first routing protocol domain; and a controller module in communication with the first and second routing protocol modules, the controller module operable to configure a forwarding structure of the forwarding plane with the primary and backup next hops.

* * * * *